UNITED STATES PATENT OFFICE.

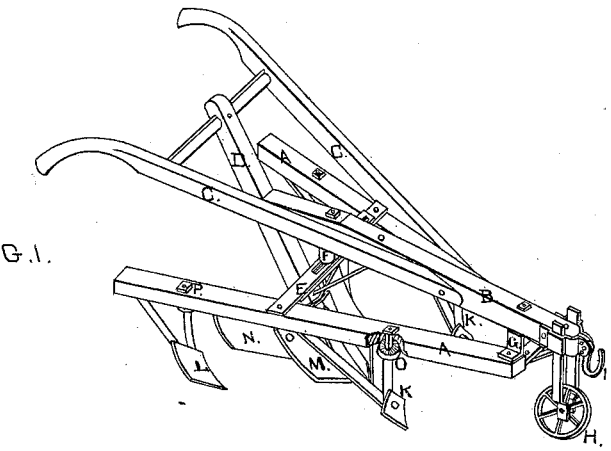
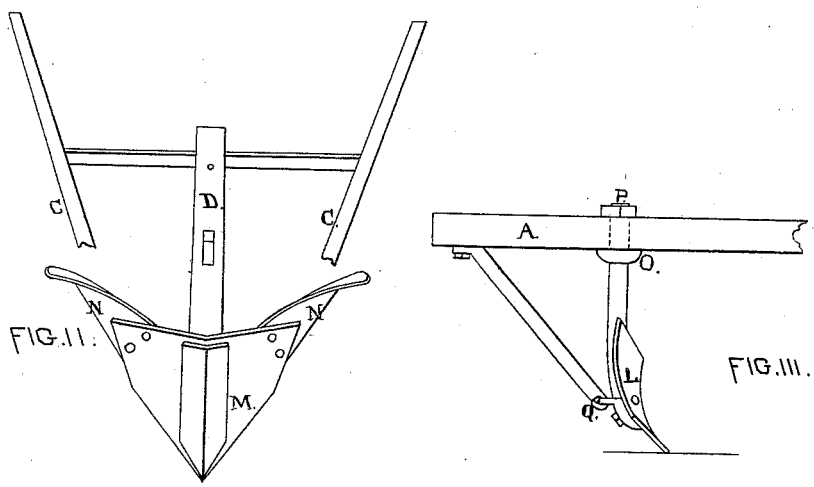

GUILFORD D. ROWELL, OF MENOMONEE FALLS, WISCONSIN.

IMPROVEMENT IN HORSE HOES AND CULTIVATORS.

Specification forming part of Letters Patent No. 113,934, dated April 18, 1871.

I, GUILFORD D. ROWELL, of Menomonee Falls, county of Waukesha, in the State of Wisconsin, have invented certain Improvements in Horse Hoes and Cultivators, of which the following is a specification:

Nature and Object of the Invention.

My invention is a horse hoe and cultivator, with teeth adjustable to any width of the sides, with twisted wings on the hoe, so as to turn the earth up against corn or any other vegetable cultivated, and also with wing shares or teeth in the rear of the side pieces of the cultivator to turn the dirt over, and with a serrated collar on the tooth-stock and under the cultivator-frame, to hold the teeth in any position they may be placed.

Description of the Drawing forming part of this Specification.

Figure 1 is a perspective view of my invention; Fig. 2, a front view of the hoe, and Fig. 3 a view of the rear side tooth and swing connection.

General Description.

A is the frame of the cultivator; B, the hoe-beam; C, the handles; D, the rear post of the hoe. This beam B, handles C, and post D, with hoe or share M, form the horse-hoe when separated from the cultivator. E, cross-bar of the cultivator, and on which the stud F rests; G, iron strap, securing the two forward ends of the cultivator to the beam B; H, wheel; I, hook to haul the hoe and cultivator by; K, cultivator-tooth; L, share in rear end of the cultivator; M, hoe; N N, twisted or curved wings of the hoe; O, serrated collar on the tooth-stock, the tooth-stock being square with a shoulder under the collar, and the collar has a square hole in it, so that when pressed up against the frame it will hold the tooth firmly in position; P, nuts on the top ends of tooth-shank.

The operation of this hoe and cultivator is that, the beam B being higher than the common cultivator, when cultivating between the rows of corn the whiffletrees are higher up than ordinary, and pass over the tops of the corn without breaking it down or disturbing it; and when the frame is spread farther apart or brought nearer together, the teeth can be set so as to move in a line with the draft, the serrated collars O holding the teeth firmly in position, the nut P being loosened and the tooth turned, and the nut set up again in position.

The share L can be turned out so as to throw the dirt as desired, the joint Q allowing it to be turned.

The hoe M will turn the earth up by means of the twisted wings, as desired.

Whenever this machine is to be used as a cultivator alone, then remove share M and put on a cultivator-tooth in place of it.

Claim.

I claim as my invention—

A horse hoe and cultivator arranged as follows: horse-hoe M, with wings N N, hoe-beam C, cultivator-teeth K, plow-share L in rear of frame A, serrated nuts O on the tooth-stocks, and joints D in rear of share L, and frame A, substantially as described.

GUILFORD D. ROWELL.

Witnesses:
 JOHN H. VOLLAND,
 JOHN E. SEABOLD.